United States Patent
Osawa

(10) Patent No.: US 11,223,515 B2
(45) Date of Patent: Jan. 11, 2022

(54) CLUSTER SYSTEM, CLUSTER SYSTEM CONTROL METHOD, SERVER DEVICE, CONTROL METHOD, AND NON-TRANSITORY COMPUTER-READABLE MEDIUM STORING PROGRAM

(71) Applicant: NEC Corporation, Tokyo (JP)

(72) Inventor: Ryosuke Osawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/642,096

(22) PCT Filed: May 17, 2018

(86) PCT No.: PCT/JP2018/019086
§ 371 (c)(1),
(2) Date: Feb. 26, 2020

(87) PCT Pub. No.: WO2019/049433
PCT Pub. Date: Mar. 14, 2019

(65) Prior Publication Data
US 2020/0186410 A1    Jun. 11, 2020

(30) Foreign Application Priority Data
Sep. 6, 2017   (JP) .............................. JP2017-171129

(51) Int. Cl.
*H04L 12/24* (2006.01)
*H04L 12/46* (2006.01)
(Continued)

(52) U.S. Cl.
CPC .......... *H04L 41/0654* (2013.01); *H04L 12/46* (2013.01); *H04L 67/42* (2013.01); *H04L 67/02* (2013.01)

(58) Field of Classification Search
None
See application file for complete search history.

(56) References Cited

U.S. PATENT DOCUMENTS

| 6,134,673 A * | 10/2000 | Chrabaszcz ......... G06F 11/1658 714/10 |
| 8,543,692 B2 * | 9/2013 | Takeshima .......... H04L 67/1034 709/224 |

(Continued)

FOREIGN PATENT DOCUMENTS

| JP | H11-338725 A | 12/1999 |
| JP | 2010-103695 A | 5/2010 |
| JP | 2012-025390 A | 2/2012 |

OTHER PUBLICATIONS

Extended European Search Report for EP Application No. EP18853103.2 dated Oct. 5, 2020.

(Continued)

*Primary Examiner* — Dhairya A Patel
(74) *Attorney, Agent, or Firm* — Sughrue Mion, PLLC

(57) ABSTRACT

The present disclosure is to more reliably determine whether an active-system server appropriately provides a service to a client. A cluster system (1) includes an active-system server (2) that provides a predetermined service to a client device through a network (4) and a standby-system server (3) that provides the predetermined service to the client device in place of the active-system server (2) when an abnormality occurs in the active-system server (2). The standby-system server (3) includes a monitoring unit (6) that accesses the predetermined service provided by the active-system server (2) through the network (4) to monitor whether the predetermined service is normally accessible. The active-system server (2) includes a cluster controlling unit (5) that performs a failover when the monitoring unit (6) of the standby-system server (3) determines that the predetermined service provided by the active-system server (2) is not normally accessible.

5 Claims, 8 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 2005/0289390 A1* | 12/2005 | Baba | G06F 11/2028 |
| | | | 714/11 |
| 2007/0076593 A1 | 4/2007 | Sakurai et al. | |
| 2009/0077370 A1* | 3/2009 | Barabash | G06F 11/2028 |
| | | | 713/100 |
| 2009/0089567 A1* | 4/2009 | Boland, IV | G06F 8/65 |
| | | | 713/2 |
| 2009/0157851 A1* | 6/2009 | Dake | H04L 41/0853 |
| | | | 709/220 |
| 2009/0158081 A1* | 6/2009 | Dake | G06F 11/2028 |
| | | | 714/3 |
| 2013/0179876 A1* | 7/2013 | Aliminati | H04L 63/0209 |
| | | | 717/177 |
| 2013/0205017 A1* | 8/2013 | Hirose | H04L 41/0668 |
| | | | 709/224 |
| 2014/0095925 A1* | 4/2014 | Wilson | G06F 11/2028 |
| | | | 714/4.12 |
| 2015/0212909 A1* | 7/2015 | Sporel | H04L 61/103 |
| | | | 714/4.11 |
| 2017/0223556 A1* | 8/2017 | Elliott | H04W 24/06 |
| 2020/0112628 A1* | 4/2020 | Barszczak | G06F 11/1687 |
| 2020/0186410 A1* | 6/2020 | Osawa | H04L 67/42 |

OTHER PUBLICATIONS

International Search Report for PCT Application No. PCT/JP2018/019086, dated Jul. 17, 2018.

\* cited by examiner

CLUSTER SYSTEM, CLUSTER SYSTEM CONTROL METHOD, SERVER DEVICE, CONTROL METHOD, AND NON-TRANSITORY COMPUTER-READABLE MEDIUM STORING PROGRAM

This application is a National Stage Entry of PCT/JP2018/019086 filed on May 17, 2018, which claims priority from Japanese Patent Application 2017-171129 filed on Sep. 6, 2017, the contents of all of which are incorporated herein by reference, in their entirety.

TECHNICAL FIELD

The present invention relates to a cluster system, a cluster system control method, a server device, a control method, and a non-transitory computer-readable medium storing a program.

BACKGROUND ART

As a technique for improving the availability of a system, a high availability (HA) cluster system has been used. For example, Patent Literature 1 discloses a cluster system including an in-operation system device that performs processing operation in response to a processing request from a client, a standby system device that takes over the processing operation when the in-operation system device is broken down, a local area network (LAN) that connects the in-operation system device to the standby system device and the client, and a connecting path that connects the in-operation device and the standby system device.

Generally, an HA cluster system includes an active-system server that provides a predetermined service, such as a business service, and a standby-system server that takes over providing the service when a failure occurs. Running servers constituting a cluster mutually monitor whether the mutual communication is performed. That is, this monitoring is performed by heartbeat. In addition to this, the active-system server monitors whether its own server normally provides the service, and the standby-system server also monitors whether its own server normally takes over the service.

CITATION LIST

Patent Literature

Japanese Unexamined Patent Application Publication No. H11-338725

SUMMARY OF INVENTION

Technical Problem

An active-system server determines whether its own server appropriately provide a service by combining, for example, disk monitoring, network interface card (NIC) monitoring, public LAN monitoring, and monitoring for a specific service (protocol monitoring for a hypertext transfer protocol (HTTP)) in monitoring its own server. However, this determination is performed by the active-system server itself, and providing the service to an external client through a public LAN is not certainly guaranteed.

A purpose of the present invention is to provide, in consideration of the above problem, a cluster system, a cluster system control method, a server device, a control method, and a non-transitory computer-readable medium storing a program that are capable of reliably determining whether an active-system server appropriately provides a service to a client.

Solution to Problem

A cluster system according to an aspect of the present invention includes an active-system server device that provides a predetermined service to a client device through a network, and a standby-system server device that provides the predetermined service to the client device in place of the active-system server device when an abnormality occurs in the active-system server device, in which the standby-system server device includes first monitoring means for accessing the predetermined service provided by the active-system server device through the network to monitor whether the predetermined service is normally accessible, and the active-system server device includes cluster controlling means for performing a failover when the first monitoring means of the standby-system server device determines that the predetermined service provided by the active-system server device is not normally accessible.

A cluster system control method according to an aspect of the present invention includes providing, by an active-system server device, a predetermined service to a client device through a network, accessing, by a standby-system server device constituting, together with the active-system server device, a cluster system, the predetermined service provided by the active-system server device through the network to monitor whether the predetermined service is normally accessible, and performing, by the active-system server device, a failover when the standby-system server device determines that the predetermined service provided by the active-system server device is not normally accessible.

A server device according to an aspect of the present invention includes service providing means for providing a predetermined service to a client device through a network, and cluster controlling means for acquiring a monitoring result transmitted from a standby-system server device that accesses the predetermined service provided by the service providing means through the network to monitor whether the predetermined service is normally accessible, and for performing a failover when the monitoring result indicates that the predetermined service is not normally accessible from the standby-system server device, in which the standby-system server device takes over the providing the predetermined service to the client device when the failover is performed.

A control method according to an aspect of the present invention includes providing a predetermined service to a client device through a network, and acquiring a monitoring result transmitted from a standby-system server device that accesses the predetermined service through the network to monitor whether the predetermined service is normally accessible, and performing a failover when the monitoring result indicates that the predetermined service is not normally accessible from the standby-system server device, in which the standby-system server device takes over the providing the predetermined service to the client device when the failover is performed.

A program according to an aspect of the present invention causes a computer to execute a service providing step of providing a predetermined service to a client device through a network, and a cluster controlling step of acquiring a monitoring result transmitted from a standby-system server device that accesses the predetermined service provided by processing of the service providing step through the network to monitor whether the predetermined service is normally accessible, and of performing a failover when the monitoring result indicates that the predetermined service is not normally accessible from the standby-system server device, in which the standby-system server device takes over the providing the predetermined service to the client device when the failover is performed.

Advantageous Effects of Invention

According to the present invention, it is possible to provide a cluster system, a cluster system control method, a server device, a control method, and a non-transitory computer-readable medium storing a program that are capable of reliably determining that an active-system server appropriately provides a service to a client.

DESCRIPTION OF EMBODIMENTS

Figure 1:
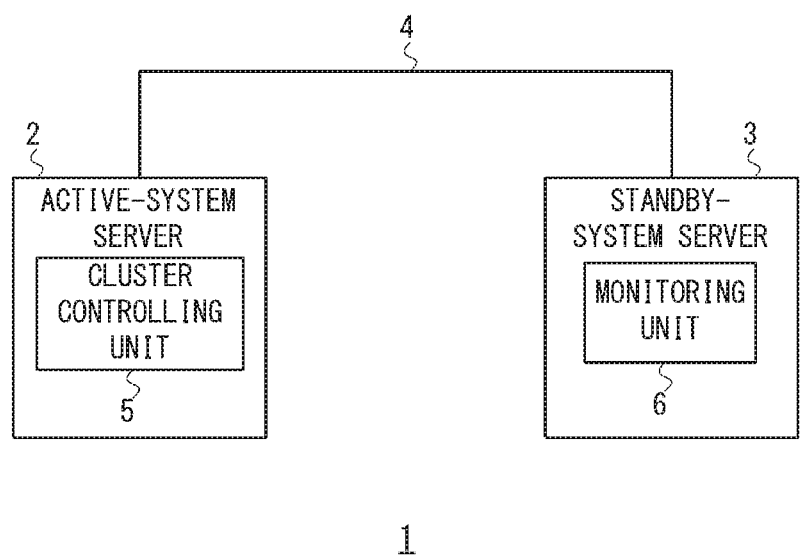
FIG. 1 is a block diagram showing an example of a configuration of a cluster system according to an outline of an example embodiment.

For the sake of clarify, the following descriptions and drawings are omitted and simplified as appropriate. In the drawings, the same elements are denoted by the same reference signs, and duplicated descriptions are omitted as necessary.

Outline of Example Embodiment

Before an example embodiment is described, an outline of the example embodiment according to the present invention is described. FIG. 1 is a block diagram showing an example of a configuration of a cluster system 1 according to the outline of the example embodiment. As shown in FIG. 1, the cluster system 1 includes an active-system server 2, a standby-system server 3, and a network 4.

The active-system server 2 is a server device that provide a predetermined service to a client device (not shown) through the network 4. That is, the client device accesses the predetermined service provided by the active-system server 2 through the network 4.

The standby-system server 3 is a server device that provides the predetermined service to the client device in place of the active-system server 2 when an abnormality occurs in the active-system server 2.

The standby-system server 3 includes a monitoring unit 6 (monitoring means), and the active-system server 2 includes a cluster controlling unit 5 (cluster controlling means). The monitoring unit 6 accesses the predetermined service provided by the active-system server 2 through the network 4 to monitor whether the predetermined service is normally accessible. That is, the monitoring unit 6 accesses the active-system server 2 through the network 4 similarly to the client device. The cluster controlling unit 5 performs a failover when the monitoring unit 6 of the standby-system server 3 determines that the predetermined service provided by the active-system server 2 is not normally accessible. For example, the cluster controlling unit 5 performs a failover so that the standby-system server 3 takes over the providing the predetermined service.

Generally, in order for an active-system server to monitor a service by itself, a loopback address is used. Thus, the monitoring is performed by communication processing closed in the server. For this reason, it is impossible to check whether the service is accessible by communicating using a specific port number through a network actually used by a client device. In addition, it is possible to check the communication with network equipment connected to the server with ping (Internet control message protocol (ICMP)), but it is difficult to detect abnormality when external communication is not performed using the specific port number due to a breakdown of external network equipment, a bug of an Operating System (OS), a misconfiguration of a firewall, or the like. For this reason, it is impossible to reliably determine whether the service is provided to the client device. Although it is possible to more reliably perform the determination by introducing operation management software and an operation management server for monitoring the service, this requires the introduction and operation costs.

In contrast, in the cluster system 1, the standby-system server 3 accesses the service provided by the active-system server 2 through the network 4 used by the client device to access the service, in order to monitor whether the active-system server 2 provides the service. Thus, it is possible to monitor whether the service is provided by accessing the service similarly to the client device that actually receives the service.

Thus, with the cluster system 1, it is possible to more reliably determine whether the active-system server appropriately provides a service to the client device. In addition, since the monitoring is performed with the standby-system server 3, it is unnecessary to prepare a new operation management server for monitoring the service and to introduce new operation management software for monitoring the service, and it is possible to reduce the introduction and operation costs.

First Example Embodiment

Figure 2:
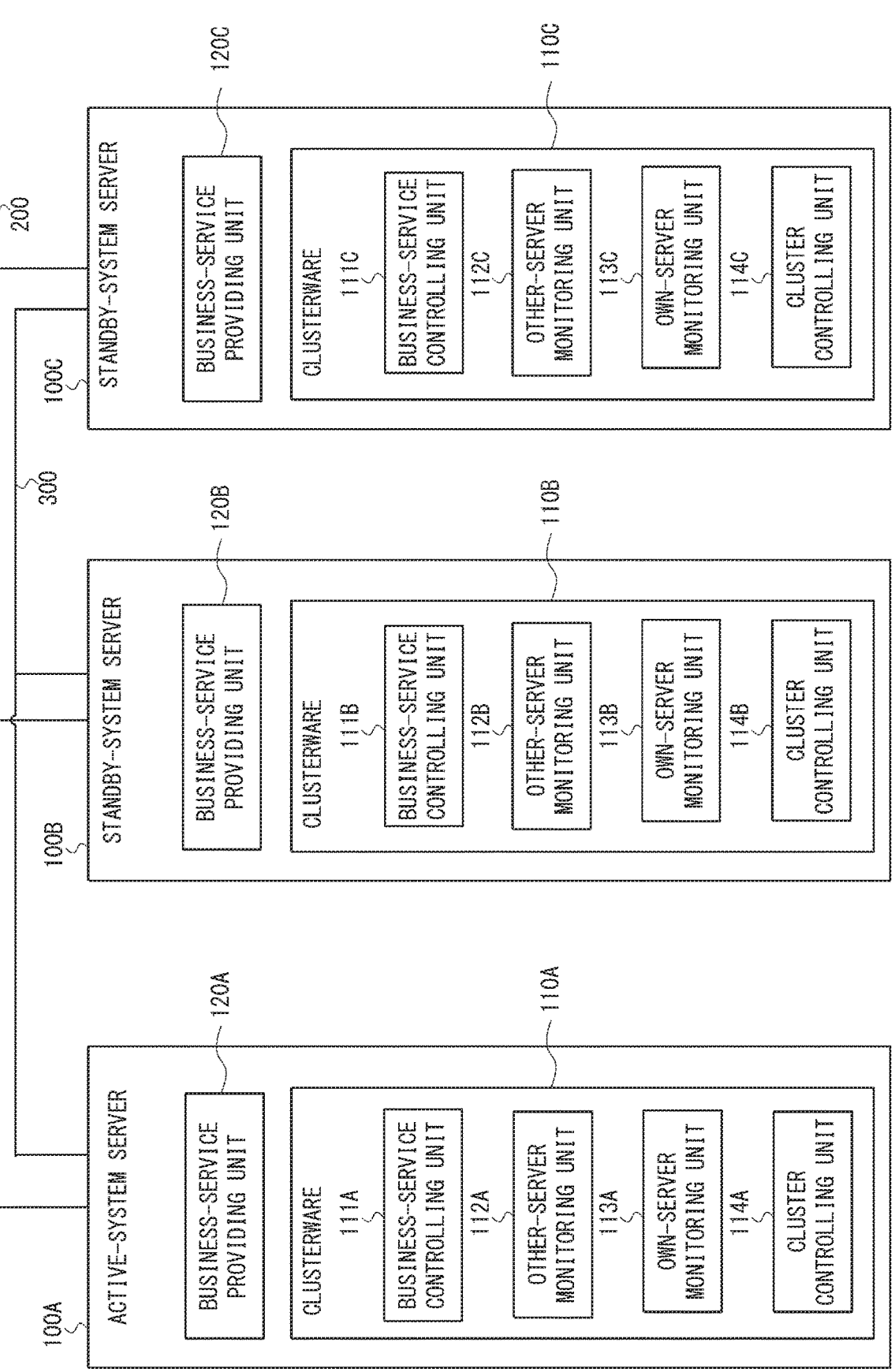
FIG. 2 is a block diagram showing an example of a functional configuration of a cluster system according to an example embodiment.
Figure 3:
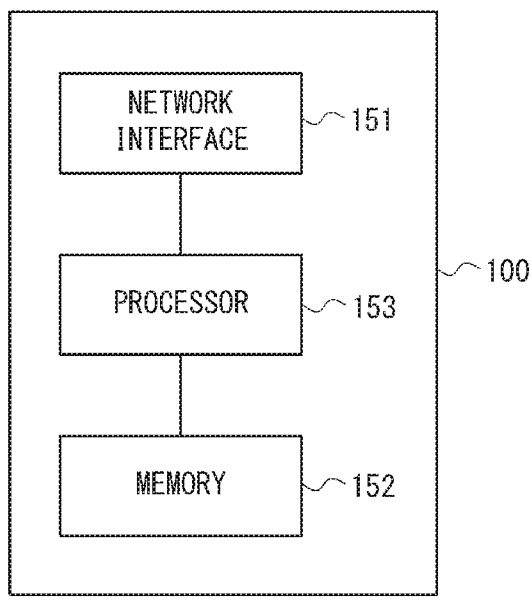
FIG. 3 is a block diagram showing an example of a hardware configuration of each server constituting the cluster system according to the example embodiment.

Hereinafter, an example embodiment of the present invention is described. FIG. 2 is a block diagram showing an example of a functional configuration of a cluster system 10 according to an example embodiment. FIG. 3 is a block diagram showing an example of a hardware configuration of each server constituting the cluster system 10.

As shown in FIG. 2, the cluster system 10 according to the present example embodiment includes an active-system server 100A, a standby-system server 100B, a standby-system server 100C, a network 200, and a network 300. The active-system server 100A and the standby-system servers 100B and 100C include clusterware 110A, 110B, and 110C respectively, and constitute a HA cluster system by communicating with each other through the networks 200 and 300. In the following description, the servers constituting the cluster system 10 can be referred to as servers 100 without distinction.

The active-system server 100A corresponds to the active-system server 2 in FIG. 1, and provides a business service to a client through the network 200. The standby-system servers 100B and 100C correspond to the standby-system server 3 in FIG. 1, and provide the business service to the client in place of the active-system server 100A when an abnormality occurs in the active-system server 100A. That is, the standby-system servers 100B and 100C take over the providing the business service to the client when a failover is performed.

As shown in FIG. 2, the active-system server 100A includes a business-service providing unit 120A and clusterware 110A. The clusterware 110A includes a business-service controlling unit 111A, an other-server monitoring unit 112A, an own-server monitoring unit 113A, and a cluster controlling unit 114A. The standby-system servers 100B and 100C each have a configuration similar to that of the active-system server 100A. That is, the standby-system server 100B includes a business-service providing unit 120B and clusterware 110B including a business-service controlling unit 111B, an other-server monitoring unit 112B, an own-server monitoring unit 113B, and a cluster controlling unit 114B. The standby-system server 100C includes a business-service providing unit 120C and clusterware 110C including a business-service controlling unit 111C, an other-server monitoring unit 112C, an own-server monitoring unit 113C, and a cluster controlling unit 114C.

Note that, the business-service providing units 120A, 120B, and 120C can be referred to as a business-service providing unit 120 without distinction. The clusterware 110A, 110B, and 110C can be referred to as clusterware 110 without distinction. The business-service controlling units 111A, 111B, and 111C can be referred to as a business-service controlling unit 111 without distinction. The other-server monitoring units 112A, 112B, and 112C can be referred to as an other-server monitoring unit 112 without distinction. The own-server monitoring units 113A, 113B, and 113C can be referred to as an own-server monitoring unit 113 without distinction. The cluster controlling units 114A, 114B, and 114C can be referred to as a cluster controlling unit 114 without distinction.

Here, an example of a hardware configuration of each server 100 is shown with reference to FIG. 3. Each server 100 includes a network interface 151, a memory 152, and a processor 153.

The network interface 151 is used to communicate with other devices through the network 200 or the network 300. The network interface 151 may include, for example, a network interface card (NIC).

The memory 152 is constituted by combining a volatile memory and a non-volatile memory. The memory 152 may include a storage disposed away from the processor 153. In this case, the processor 153 may access the memory 152 through an input/output interface (not shown).

The memory 152 is used to store software (a computer program) and the like to be executed by the processor 153.

This program can be stored in any type of non-transitory computer-readable medium and is supplied to a computer. The non-transitory computer-readable medium includes any type of tangible storage medium. The non-transitory computer-readable medium includes, for example, a magnetic recording medium, such as a flexible disk, a magnetic tape, or a hard disk drive, a magnetooptical recording medium, such as a magnetooptical disk, a compact disc read only memory (CD-ROM), a CD-R, a CD-R/W, and a semiconductor memory, such as a mask ROM, a programmable ROM (PROM), an erasable PROM (EPROM), a flash ROM, or a random access memory (RAM). Alternatively, the program may be supplied to a computer with any type of transitory computer-readable medium. The transitory computer-readable medium includes, for example, an electrical signal, an optical signal, and an electromagnetic wave. The transitory computer-readable medium can supply the program to a computer through a wired communication channel, such as an electrical cable, an optical fiber, or the like, or a radio communication channel.

The processor 153 performs processing of the business-service providing unit 120, processing of the clusterware 110, and other processing by loading the computer program from the memory 152 and executing it. The processor 153 may be, for example, a microprocessor, an MPU, or a CPU. The processor 153 may include a plurality of processors.

The network 200 is a public LAN, and is used to communicate between the servers 100 and with external clients. That is, the network 200 is used as a network path for providing the business service to external clients.

The network 300 is an interconnect LAN, and is used to communicate between the servers 100, but is not used to communicate with external clients. In consideration of avoiding the influence to the business service and of the security, the network 300 is used as a dedicated line in the cluster system 10. The network 300 is used for internal communication in the cluster system 10, such as a processing request, heartbeat (life-and-death monitoring) between the servers 100, and synchronization of business data.

As described above, the network 200 is a different network from the network 300 used to perform life-and-death monitoring between the servers 100 in the active system and the standby-system.

Next, the configuration of each server 100 shown in FIG. 2 is described. The business-service providing unit 120 provides a predetermined business service in response to an access through the network 200. That is, the business-service providing unit 120 (service providing means) provides a predetermined service to a client device through the network 200. Note that, the business-service providing unit 120 is a module that operates in the server 100 in the active system. Thus, the business-service controlling unit 111A is operating in the active-system server 100A, but the business-service controlling units 111B and 111C are not operating in the standby-system servers 100B and 100C.

The cluster controlling unit 114 corresponds to the cluster controlling unit 5 in FIG. 1, and variously performs controlling for attaining the availability of the cluster system 10 in cooperation with the cluster controlling units 114 of the other servers. The cluster controlling unit 114 performs life-and-death monitoring of the other servers 100 by heartbeat, a failover, and the like. The cluster controlling unit 114 further notifies the other servers 100 of a monitoring result by the other-server monitoring unit 112, and synchronizes the monitoring result between the servers 100. Note that, the monitoring result of the business service synchronized between the servers 100 is used to determine whether the business service is normally provided and as display information for cluster management graphical user interfaces (GUI) of the servers 100. Other processing of the cluster controlling unit 114 is to be described together with the operation of the cluster system 10.

The business-service controlling unit 111 controls the start and stop of the business-service providing unit 120. In the present example embodiment, the business-service controlling unit 111 controls to start the business-service providing unit 120 in response to a start request from the cluster controlling unit 114, and controls to stop the business-service providing unit 120 in response to a stop request from the cluster controlling unit 114. That is, for example, the business-service controlling unit 111A controls to start the business-service providing unit 120A in response to a start request from the cluster controlling unit 114A, and controls to stop the business-service providing unit 120A in response to a stop request from the cluster controlling unit 114A.

The own-server monitoring unit 113 (monitoring means) monitors the states of the disk of its own server, the NIC, and the like. When detecting a failure by the monitoring, the own-server monitoring unit 113 notifies the cluster controlling unit 114 of abnormality. That is, for example, the own-server monitoring unit 113A monitors the operating state of the active-system server 100A itself, and notifies the cluster controlling unit 114A of the monitoring result. Similarly, for example, the own-server monitoring unit 113B monitors the operating state of the standby-system server 100B itself and notifies the cluster controlling unit 114B of the monitoring result.

The other-server monitoring unit 112 (monitoring means) corresponds to the monitoring unit 6 in FIG. 1, and accesses the predetermined service provided by the business-service providing unit 120 of the server 100 in the active system through the network 200 to monitor whether the predetermined service is normally accessible. That is, for example, the other-server monitoring unit 112B accesses the predetermined service provided by the business-service providing unit 120A to monitor whether the predetermined service is normally accessible. Note that, the other-server monitoring unit 112 is a module that operates in the server 100 in the standby system. Thus, the other-server monitoring units 112B and 112C are operating in the standby-system servers 100B and 100C, but the other-server monitoring unit 112 is not operating in the active-system server 100A. That is, the standby-system servers 100B and 100C monitor whether the business service provided by the active-system server 100A is accessible through the network 200 from the other-server monitoring units 112B and 112C. Note that, in the present example embodiment, the other-server monitoring unit 112 regularly performs monitoring. The other-server monitoring unit 112 notifies the cluster controlling unit 114 of the monitoring result. That is, for example, the other-server monitoring unit 112B notifies the cluster controlling unit 114B of the monitoring result.

The other-server monitoring unit 112 performs monitoring processing in accordance with a protocol (FTP, HTTP, IMAP4, POP3, SMTP, or the like) of the business service provided by the server 100 in the active system. In addition, since the other-server monitoring unit 112 performs accessing similarly to the accessing actually performed by an external client, the other-server monitoring unit 112 performs the monitoring processing through the network 200 as described above. Here, a specific example of the monitoring processing of the other-server monitoring unit 112 is described.

When the provided business service is a service using the file transfer protocol (FTP), that is, when the active-system server 100A functions as an FTP server, the other-server monitoring unit 112 connects to the FTP server to be monitored and performs user authentication processing. Then, the other-server monitoring unit 112 acquires a file list of the FTP server. The other-server monitoring unit 112 determines, based on that the above processing has been normally performed, that the service is normally provided.

When the provided business service is a service using the HTTP, that is, when the active-system server 100A functions as an HTTP server, the other-server monitoring unit 112 transmits an HTTP request to the HTTP server to be monitored, and determines, based on that the processing result of the HTTP response from the HTTP server has been normal, that the service is normally provided.

When the provided business service is a service using the internet message access protocol 4 (IMAP4), that is, when the active-system server 100A functions as an IMAP server, the other-server monitoring unit 112 connects to the IMAP server to be monitored, and performs user authentication processing. Then, the other-server monitoring unit 112 executes a NOOP command. The other-server monitoring unit 112 determines, based on that the above processing has been normally performed, that the service is normally provided.

When the provided business service is a service using the post office protocol 3 (POP3), that is, when the active-system server 100A functions as a POP3 server, the other-server monitoring unit 112 connects to the POP3 server to be monitored, and performs user authentication processing. Then, the other-server monitoring unit 112 executes a NOOP command. The other-server monitoring unit 112 determines, based on that the above processing has been normally performed, that the service is normally provided.

When the provided business service is a service using the simple mail transfer protocol (SMTP), that is, when the active-system server 100A functions as an SMTP server, the other-server monitoring unit 112 connects to the SMTP server to be monitored, and performs user authentication processing. Then, the other-server monitoring unit 112 executes a NOOP command. The other-server monitoring unit 112 determines, based on that the above processing has been normally performed, that the service is normally provided.

Note that, in order to perform monitoring suitable for the system environment, the other-server monitoring unit 112 may use a time-out period or the number of retries as a threshold to determine abnormality in the monitoring. For example, the other-server monitoring unit 112 may determine that the server 100 in the active system does not provide the service normally when the business service cannot be normally accessed within a predetermined time-out period. Alternatively, the other-server monitoring unit 112 may determine that the server 100 in the active system does not provide the service normally when the business service cannot be normally accessed within a predetermined number of retries.

With the above configuration, the cluster system 10 performs, for example, the following operation. In the active-system server 100A, the business-service providing unit 120A is started under the control of the business-service controlling unit 111A in response to a request from the cluster controlling unit 114A. The business-service providing unit 120A thereby provides the business service to an external client through the network 200. In the active-system server 100A, the own-server monitoring unit 113 monitors the operating state of the active-system server 100A itself, and notifies the cluster controlling unit 114A of abnormality when a failure occurs. The cluster controlling unit 114A notified of the abnormality requests the business-service controlling unit 111A to stop providing the business service in order to stop the operation of the business-service providing unit 120A. Then, the cluster controlling unit 114A performs a failover by requesting the cluster controlling unit 114B of the standby-system server 100B to start the business-service providing unit 120B in order to cause the standby-system server 100B to provide the business service.

In the standby-system servers 100B and 100C, the own-server monitoring units 113B and 113C monitor the operating states of their own servers. In addition, the other-server monitoring units 112B and 112C monitor whether the business service provided by the active-system server 100A is accessible through the network 200. The cluster controlling units 114B and 114C notify the cluster controlling unit 114A of the active-system server 100A of the monitoring results by the other-server monitoring units 112. The cluster controlling unit 114A determines that a failure occurs in the active-system server 100A, and performs a failover of the business service when both the standby-system servers 100B and 100C obtain the monitoring results indicating that the business service of the active-system server 100A is not accessible.

As described above, in the present example embodiment, the cluster controlling unit 114A performs a failover when the other-server monitoring units 112 of a plurality of standby-system servers 100 determine that the predetermined service provided by the active-system server 100A is not normally accessible. More specifically, the cluster controlling unit 114A performs a failover when the other-server monitoring units 112 of at least a predetermined percentage of standby-system servers 100 among the plurality of servers in the standby system determine that the predetermined service provided by the active-system server 100A is not normally accessible. Note that, in the present example embodiment, specifically, when the other-server monitoring units 112 of the standby-system servers 100 more than half of a plurality of standby-system servers 100 determine that the service is not normally accessible, the cluster controlling unit 114A of the active-system server 100A performs a failover. In this manner, in the present example embodiment, the cluster system 10 determines whether to perform a failover considering all the monitoring results of the other-server monitoring units 112 of a plurality of standby-system servers 100. Thus, it is possible to prevent a failover caused by erroneous detection of the other-server monitoring units 112 due to a breakdown of the standby-system servers 100.

Figure 4:
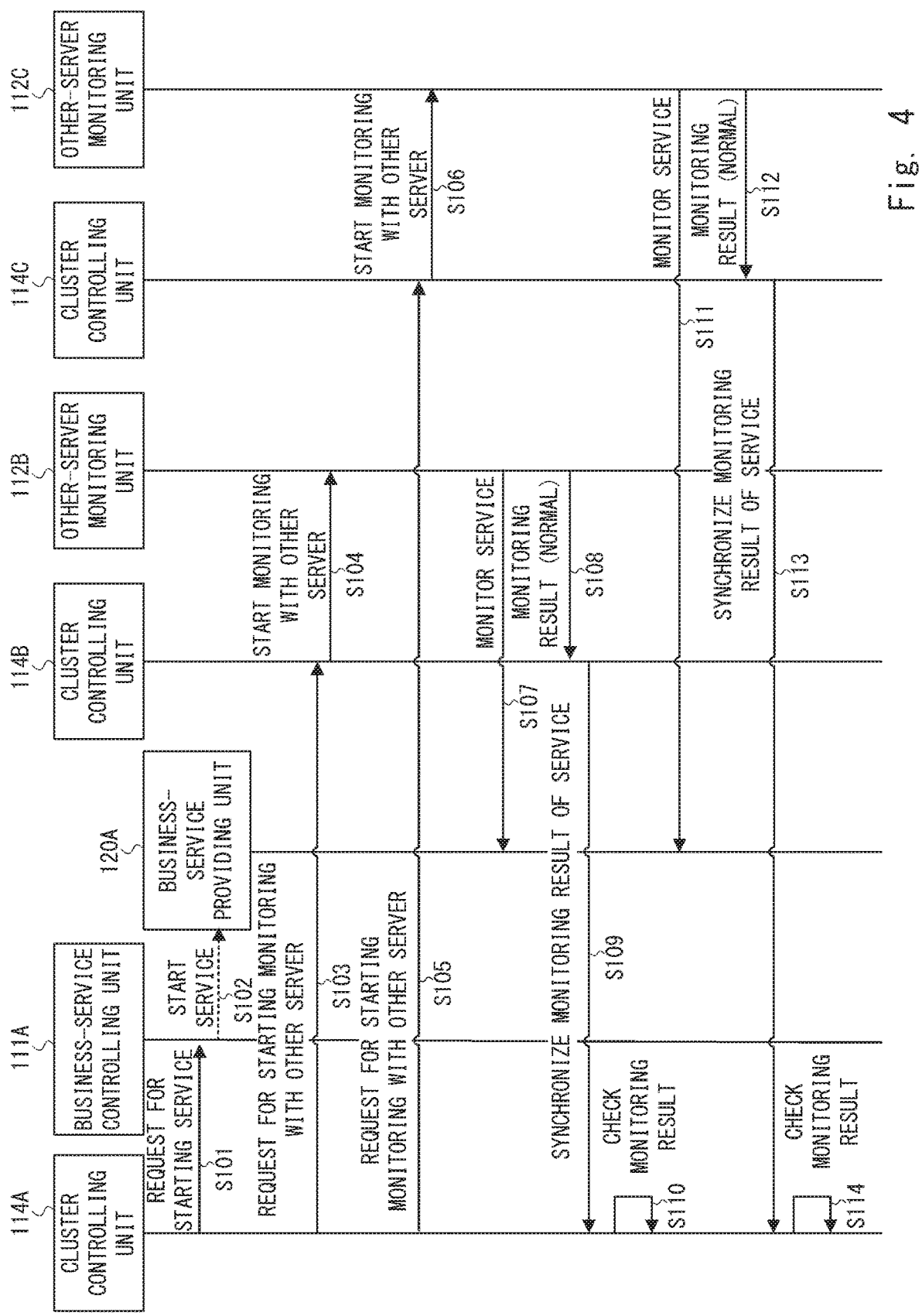
FIG. 4 is a sequence chart showing an operation example when the cluster system starts to provide a business service.

Next, a specific example operation of the cluster system 10 is described with a sequence chart. FIG. 4 is a sequence chart showing the operation when the cluster system 10 starts to provide the business service. In the following, the operation of the cluster system 10 is described along FIG. 4.

In step 101 (S101), the cluster controlling unit 114A requests the business-service controlling unit 111A to start the business-service providing unit 120A. Thus, in step 102 (S102), the business-service controlling unit 111A starts the business-service providing unit 120A.

When the business service is available, in step 103 (S103), the cluster controlling unit 114A requests the cluster controlling unit 114B to start regular monitoring processing for the business service that the active-system server 100A has started to provide. Thus, in step 104 (S104), the cluster controlling unit 114B requests the other-server monitoring unit 112B to start the regular monitoring processing for the business service that the active-system server 100A has started to provide.

Next, in step 105 (S105), the cluster controlling unit 114A request the cluster controlling unit 114C to start regular monitoring processing for the business service that the active-system server 100A has started to provide. Thus, in step 106 (S106), the cluster controlling unit 114C requests the other-server monitoring unit 112C to start the regular monitoring processing for the business service that the active-system server 100A has started to provide.

Next, in step 107 (S107), the other-server monitoring unit 112B performs the regular monitoring processing for the business service. The other-server monitoring unit 112B actually accesses the business service through the network 200 to check whether the business service is available. Note that, it is assumed that the other-server monitoring unit 112B determines that the business service is normally accessible (that is, the business service is normally available).

In step 108 (S108), the other-server monitoring unit 112B notifies the cluster controlling unit 114B of the monitoring result (normal) obtained in step 107.

In step 109 (S109), the cluster controlling unit 114B notifies the other servers 100 of the monitoring result (normal) sent in step 108 to synchronize the monitoring result.

Next, in step 110 (S110), the cluster controlling unit 114A checks the synchronized monitoring result to determine whether a failover is required. Here, the cluster controlling unit 114A determines that a failover is not required.

Next, in step 111 (S111), the other-server monitoring unit 112C performs the regular monitoring processing for the business service similarly to the other-server monitoring unit 112B. Note that, here, it is assumed that the other-server monitoring unit 112C determines that the business service is normally accessible (that is, the business service is normally available).

In step 112 (S112), the other-server monitoring unit 112C notifies the cluster controlling unit 114C of the monitoring result (normal) obtained in step 111.

In step 113 (S113), the cluster controlling unit 114C notifies the other servers 100 of the monitoring result (normal) sent in step 112 to synchronize the monitoring result.

Next, in step 114 (S114), the cluster controlling unit 114A checks the synchronized monitoring result to determine whether a failover is required. Here, the cluster controlling unit 114A determines that a failover is not required.

Figure 5:
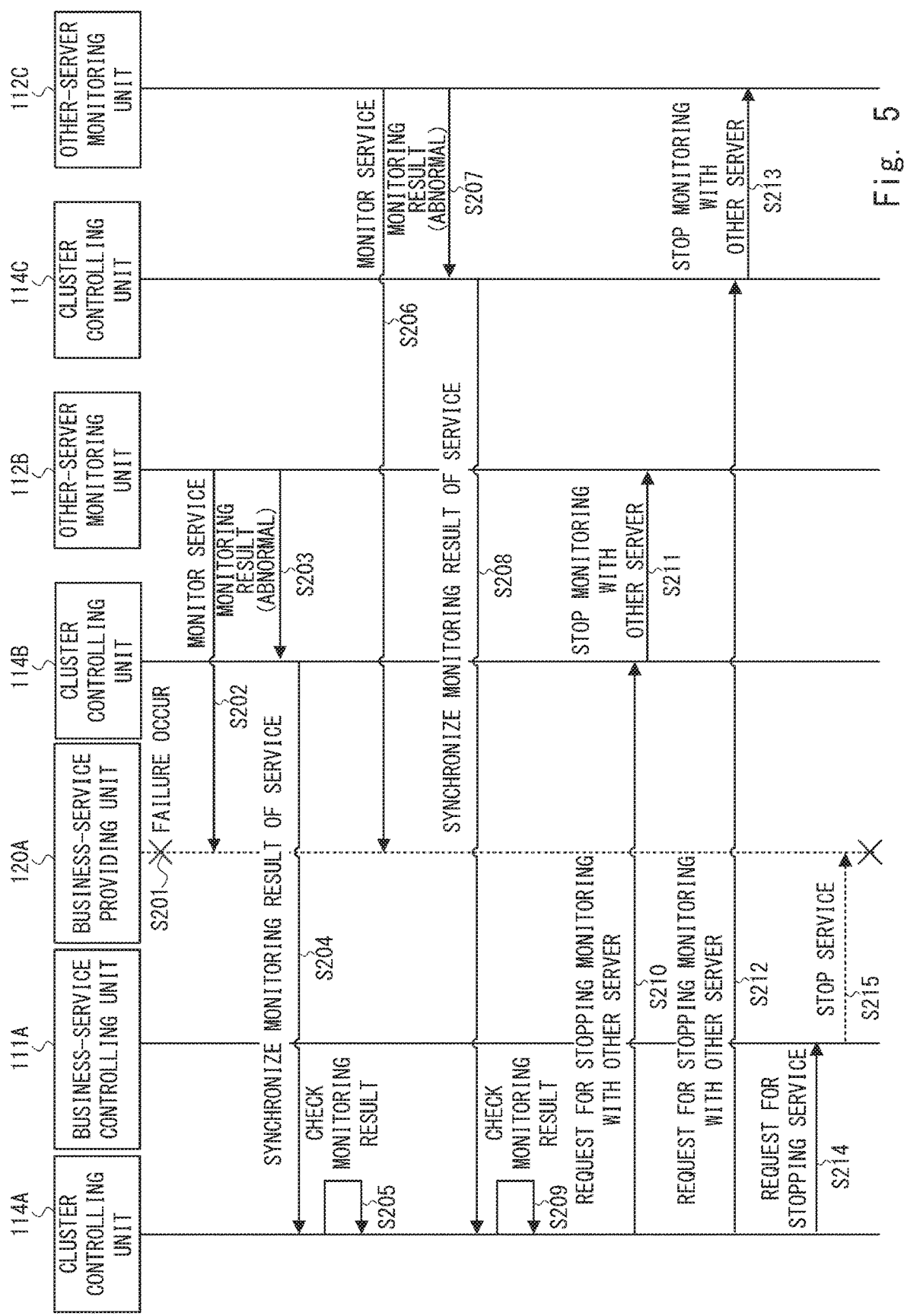
FIG. 5 is a sequence chart showing an operation example of the cluster system when a standby-system server detects abnormality of the business service.

FIG. 5 is a sequence chart showing an operation example of the cluster system 10 when the standby-system server 100 detects abnormality of the business service. In the following, the operation of the cluster system 10 when the other-server monitoring unit 112 detects abnormality is described along FIG. 5.

In step 201 (S201), a failure occurs in the business service provided by the business-service providing unit 120A, and the business service is unavailable from the external client.

In step 202 (S202), the other-server monitoring unit 112B performs the regular monitoring processing for the business service similarly to step 107 in FIG. 4. In step 202, the other-server monitoring unit 112 determines that the business service is not normally accessible (that is, the business service is not normally available).

In step 203 (S203), the other-server monitoring unit 112B notifies the cluster controlling unit 114B of the monitoring result (abnormal) obtained in step 202.

In step 204 (S204), the cluster controlling unit 114B notifies the other servers 100 of the monitoring result (abnormal) sent in step 203 to synchronize the monitoring result.

Next, in step 205 (S205), the cluster controlling unit 114A checks the synchronized monitoring result to determine whether a failover is required. At this time, since the number of the standby-system servers 100 having detected the abnormality is one, and is less than half of the total standby-system servers 100, the cluster controlling unit 114A determines that a failover is not required.

In step 206 (S206), the other-server monitoring unit 112C performs the regular monitoring processing for the business service similarly to step 111 in FIG. 4. In step 206, the other-server monitoring unit 112 determines that the business service is not normally accessible (that is, the business service is not normally available).

In step 207 (S207), the other-server monitoring unit 112C notifies the cluster controlling unit 114C of the monitoring result (abnormal) obtained in step 206.

In step 208 (S208), the cluster controlling unit 114C notifies the other servers 100 of the monitoring result (abnormal) sent in step 207 to synchronize the monitoring result.

Next, in step 209 (S209), the cluster controlling unit 114A checks the synchronized monitoring result to determine whether a failover is required. Since the number of the standby-system servers 100 having detected the abnormality is two, and is more than half of the total number of the standby-system servers 100, the cluster controlling unit 114A starts a failover. Specifically, failover processing is performed as follows.

In step 210 (S210), the cluster controlling unit 114A requests the cluster controlling unit 114B to terminate the regular monitoring processing for the business service. Thus, in step 211 (S211), the cluster controlling unit 114B requests the other-server monitoring unit 112B to terminate the regular monitoring processing for the business service.

In step 212 (S212), the cluster controlling unit 114A requests the cluster controlling unit 114C to terminate the regular monitoring processing for the business service. Thus, in step 213 (S213), the cluster controlling unit 114C requests the other-server monitoring unit 112C to terminate the regular monitoring processing for the business service.

Next, in step 214 (S214), the cluster controlling unit 114A request the business-service controlling unit 111A to terminate providing the business service. Thus, in step 215 (S215), the business-service controlling unit 111A terminates the processing of the business-service providing unit 120A. Thereafter, either one of the standby-system servers 100 performs start processing, and the failover is completed. That is, one of the standby-system servers 100 takes over the providing the business service.

The first example embodiment has been described above. In the present example embodiment, as described above, the cluster controlling unit 114A of the active-system server 100A acquires the monitoring results transmitted from the standby-system servers 100B and 100C that access a predetermined service provided by the business-service providing unit 120A through the network 200 to monitor whether the predetermined service is normally accessible. Then, the cluster controlling unit 114A performs a failover when the acquired monitoring results indicates that the predetermined service is not normally accessible from the standby-system servers 100. Thus, the monitoring as to whether the service is provided is performed by accessing the service similarly to a client that receives the service. Thus, with the cluster system 10 according to the first example embodiment, it is possible to more reliably determine whether the active-system server 100A appropriately provides the service to the client. In addition, the monitoring is performed with the standby-system servers 100B and 100C, and it is unnecessary to prepare a new operation management server for monitoring the service, and to introduce new operation management software for monitoring the service.

Furthermore, in the present example embodiment, when the other-server monitoring units 112 of the standby-system servers 100 more than half of a plurality of standby-system servers 100 determine that the service is not normally accessible, the cluster controlling unit 114A of the active-system server 100A performs a failover. Thus, it is possible to prevent the influence of erroneous detection caused when the other-server monitoring unit 112 does not normally perform monitoring due to a breakdown of the standby-system servers 100 or of network equipment connected to the standby-system servers 100.

Second Example Embodiment

Next, a different point in a second example embodiment from the first example embodiment is described. In the first example embodiment, the cluster controlling unit 114A has performed a failover, when the other-server monitoring units 112 of at least a predetermined percentage of standby-system servers 100 among all the standby-system servers 100 constituting the cluster system 10 have determined that the predetermined service provided by the active-system server 100A is not normally accessible. That is, in the first example embodiment, regardless of whether the standby-system servers 100 normally operates, the monitoring results of the other-server monitoring units 112 of the standby-system servers 100 have been used to determine whether to perform a failover.

In contrast, in the present example embodiment, a cluster controlling unit 114A of an active-system server 100A performs a failover, when other-server monitoring units 112 of at least a predetermined percentage of standby-system servers 100 among the plurality of standby-system servers 100 in which own-server monitoring units 113 have not detected an abnormality determine that a predetermined service provided by the active-system server 100A is normally accessible. That is, in the present example embodiment, when the own-server monitoring units 113 of the standby-system servers 100 have detected an abnormality in their own servers, the monitoring results by the other-server monitoring units 112 of the servers 100 do not count for majority decision.

In addition, in the present example embodiment, the cluster controlling unit 114A of the active-system server 100A determines whether to perform a failover based on the monitoring result of an own-server monitoring unit 113A of the active-system server 100A when the own-server monitoring units 113 have detected an abnormality in all the standby-system servers 100. That is, in the present example embodiment, when the own-server monitoring units 113 have determined that all the standby-system servers 100 do not normally operate, in other words, when the other-server monitoring units 112 of all the standby-system servers 100 do not normally operate, the cluster controlling unit 114A of the active-system server 100A determines, based on the monitoring result of the own-server monitoring unit 113A, whether a business service is normally provided. The own-server monitoring unit 113A of the active-system server 100A performs monitoring processing for the business service by, for example, accessing the service provided by a business-service controlling unit 111A using a loopback address.

Figure 6:
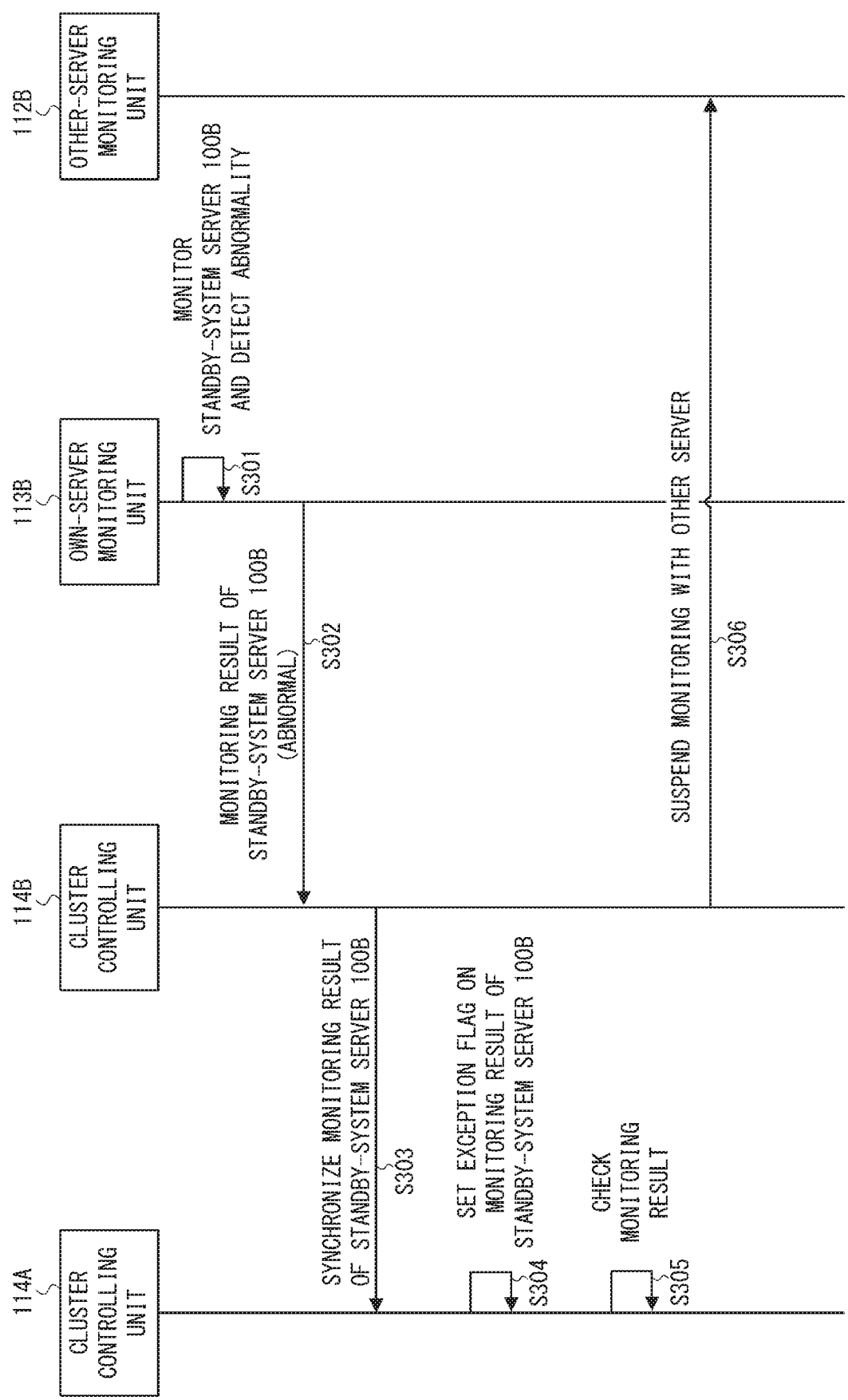
FIG. 6 is a sequence chart showing an operation example when an abnormality occurs in one standby-system server in the cluster system.

With reference to a sequence chart, a specific operation example of a cluster system 10 according to the second example embodiment is described. FIG. 6 is a sequence chart showing an operation example when an abnormality occurs in one standby-system server 100 in the cluster system 10 according to the second example embodiment. In the following, the operation of the cluster system 10 is described along FIG. 6. Note that, the example shown in FIG. 6 shows that abnormality occurs in a standby-system server 100B of two standby-system servers 100 constituting the cluster system 10. In addition, the sequence chart shown in FIG. 6 follows the sequence chart shown in, for example, FIG. 4.

In step 301 (S301), a failure occurs in the standby-system server 100B, and an own-server monitoring unit 113B of the standby-system server 100B detects the failure with monitoring processing.

In step 302 (S302), the own-server monitoring unit 113B notifies a cluster controlling unit 114B of the monitoring result (abnormal) obtained in step 301.

In step 303 (S303), the cluster controlling unit 114B notifies the other servers 100 of the monitoring result (abnormal) sent in step 302 to synchronize the monitoring result.

Next, in step 304 (S304), the cluster controlling unit 114A checks the synchronized monitoring result. Since the synchronized monitoring result indicates the abnormality of the standby-system server 100B, the cluster controlling unit 114A sets a flag (exception flag) indicating that the monitoring result by the other-server monitoring unit 112B of the standby-system server 100B is excluded from the determination for a failover.

Since the determination as to whether a failover is required can be changed by setting the exception flag of the standby-system server 100B, the cluster controlling unit 114A checks the monitoring results of the other-server monitoring units 112 of the standby-system servers 100 again in step 305 (S305). Note that, at this point, it is assumed that any of the other-server monitoring units 112 of the standby-system servers 100 have not detected an abnormality. In this case, the cluster controlling unit 114A determines that a failover is not required.

On the other hand, the cluster controlling unit 114B of the standby-system server 100B suspends the monitoring processing of the other-server monitoring unit 112B in step 306 (S306). The suspended monitoring processing of the other-server monitoring unit 112B is not resumed until the standby-system server 100B is returned to the normal state.

As described above, the cluster controlling unit 114A sets an exception flag when one standby-system server 100 sends the occurrence of abnormality in the corresponding server 100. In the second example embodiment, the cluster controlling unit 114A determines whether to perform a failover, using the monitoring results of the other-server monitoring units 112 of the standby-system servers 100 for which the exception flags have not been set among the standby-system servers 100 constituting the cluster system 10. That is, it is assumed that the number of the standby-system servers 100 constituting the cluster system 10 is N (N is an integer of 1 or more), and that the number of the standby-system servers 100 for which the exception flags have not been set is $n_1$ ($n_1$ is an integer of 1 or more and N or less). In addition, of the $n_1$ standby-system servers 100, it is assumed that the number of the servers in which the other-server monitoring units 112 have detected an abnormality is $n_2$ ($n_2$ is an integer of 1 or more and $n_1$ or less). In this case, the cluster controlling unit 114A performs a failover when $n_2/n_1$ is greater than a predetermined percentage (for example, $n_2$ is more than half of $n_1$).

In this manner, in the present example embodiment, if the own-server monitoring units 113 of the standby-system servers 100 detect abnormality of their own servers, the monitoring results of the other-server monitoring units 112 of the servers 100 are not use to determine whether to perform a failover. Thus, it is possible to prevent erroneous monitoring results by the other-server monitoring units 112 of the standby-system servers 100 in which abnormality occurs from affecting the determination as to whether to perform a failover.

Figure 7:
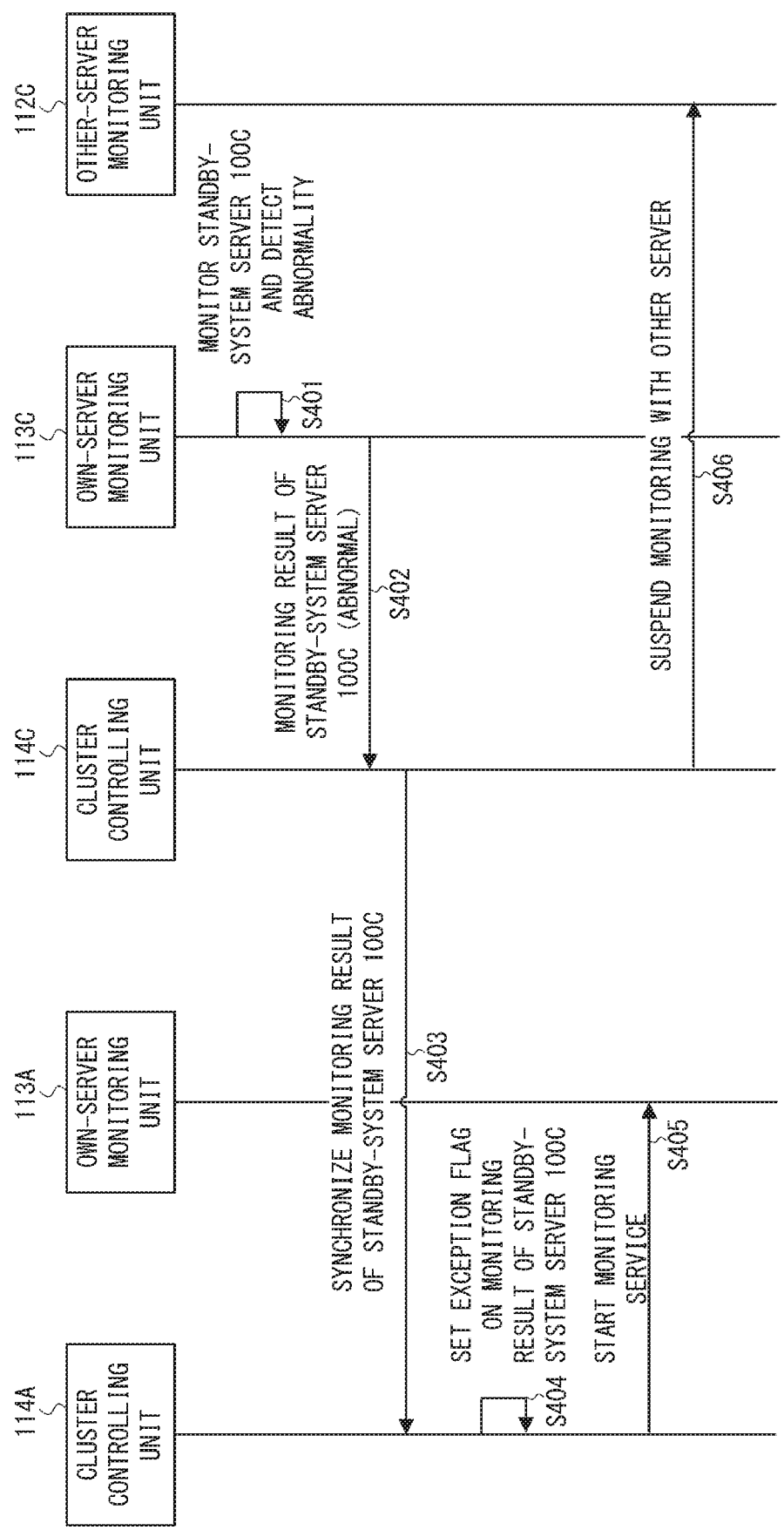
FIG. 7 is a sequence chart showing an operation example when an abnormality occurs in all standby-system servers in the cluster system.

FIG. 7 is a sequence chart showing an operation example when an abnormality occurs in all the standby-system servers 100 in the cluster system 10 according to the second example embodiment. Note that, the sequence chart shown in FIG. 7 follows the sequence chart shown in FIG. 6. That is, the sequence chart shown in FIG. 7 is a sequence chart when a failure has occurred in the standby-system server 100B. In the following, the operation of the cluster system 10 is described along FIG. 7.

In step 401 (S401), a failure occurs in a standby-system server 100C, and an own-server monitoring unit 113C of the standby-system server 100C detects the failure with monitoring processing.

In step 402 (S402), the own-server monitoring unit 113C notifies a cluster controlling unit 114C of the monitoring result (abnormal) obtained in step 401.

In step 403 (S403), the cluster controlling unit 114C notifies the other servers 100 of the monitoring result (abnormal) sent in step 402 to synchronize the monitoring result.

Next, in step 404 (S404), the cluster controlling unit 114A checks the synchronized monitoring result. Since the synchronized monitoring result indicates the abnormality of the standby-system server 100C, the cluster controlling unit 114A sets a flag (exception flag) indicating that the monitoring result by the other-server monitoring unit 112C of the standby-system server 100C is excluded from the determination for a failover.

Next, in step 405 (S405), since abnormality occurs in all the standby-system servers 100, the cluster controlling unit 114A switches so that the own-server monitoring unit 113A of the active-system server 100A monitors the business service. Thus, the cluster controlling unit 114A requests the own-server monitoring unit 113A of the active-system server 100A to start monitoring the business service. The cluster controlling unit 114A determines whether a failover is required based on the monitoring result by the own-server monitoring unit 113A until any one of the standby-system servers 100 becomes normal.

On the other hand, the cluster controlling unit 114C of the standby-system server 100C suspends the monitoring processing of the other-server monitoring unit 112C in step 406 (S406). The suspended monitoring processing of the other-server monitoring unit 112C is not resumed until the standby-system server 100C is returned to the normal state.

In this manner, in the present example embodiment, if all the standby-system servers 100 are not in the normal state, the determination for a failover can be performed with the monitoring result by the own-server monitoring unit 113 of the active-system server 100. Thus, although the monitoring results by the other-server monitoring units 112 of the standby-system servers 100 are not available, it is possible to determine whether a failover is required.

Figure 8:
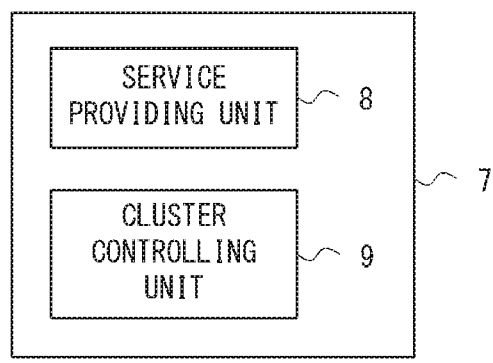
FIG. 8 is a block diagram showing an example of a configuration of a server device according to an example embodiment.

The example embodiments have been described, with a server device having a configuration shown in FIG. 8, it is possible to reliably determine whether a service is appropriately provided to a client. A server device 7 shown in FIG.

8 includes a service providing unit 8 (service providing means) and a cluster controlling unit 9 (cluster controlling means). Note that, the server device 7 constitutes a cluster system together with a standby-system server device.

The service providing unit 8 corresponds to the business-service providing unit 120 in the above example embodiments. The service providing unit 8 provides a predetermined service to a client device through a network.

The cluster controlling unit 9 corresponds to the cluster controlling unit 114 in the above example embodiments. The cluster controlling unit 9 acquires a monitoring result transmitted from the standby-system server device, and performs a failover when the monitoring result indicates that the predetermined service is not normally accessible from the standby-system server device. Here, the standby-system server device takes over providing the predetermined service to the client device when the failover is performed, and accesses the predetermined service provided by the service providing unit 8 through the network to monitor whether the service is normally accessible.

In this manner, the server device 7 acquires a monitoring result of the service based on the access by the standby-system server device, and determines whether to perform a failover. Thus, with the server device 7, it is possible to more reliably determine whether a service is appropriately provided to a client.

Note that, the present invention is not limited to the above example embodiments, and modifications can be made as appropriate without departing from the scope thereof. For example, the HA cluster system is constituted by the three servers 100 in the above example embodiments, but the cluster system 10 is only required to include the server 100 in the active system and the server 100 in the standby system, and the number of servers is arbitrary. In addition, each server 100 may be a uni-directional standby server operating as either of an active-system server or a standby-system server in a cluster configuration, and may be a bi-directional standby server operating as an active-system server and a standby-system server in the cluster configuration to constitute the cluster system 10.

The present invention has been described with the above example embodiments, but is not limited by the above example embodiments. Various modifications that can be understood by those skilled in the art can be made to the configurations and the details of the present invention without departing from the scope of the invention.

This application is based upon and claims the benefit of priority from Japanese Patent Application No. 2017-171129, filed on Sep. 6, 2017, the disclosure of which is incorporated herein in its entirety by reference.

REFERENCE SIGNS LIST 1, 10 Cluster system
2, 100A Active-system server
3, 100B, 100C Standby-system server
4, 200, 300 Network
5, 9, 114, 114A, 114B, 114C Cluster controlling unit
6 Monitoring unit
7 Server device
8 Service providing unit
9 Cluster controlling unit
100 Server
110, 110A, 110B, 110C Clusterware
111, 111A, 111B, 111C Business-service controlling unit
112, 112A, 112B, 112C Other-server monitoring unit
113, 113A, 113B, 113C Own-server monitoring unit
120, 120A, 120B, 120C Business-service providing unit
151 Network interface
152 Memory
153 Processor

What is claimed is:

1. A cluster system comprising:
an active-system server device configured to provide a predetermined service to a client device through a network; and
a standby-system server device configured to provide the predetermined service to the client device in place of the active-system server device when an abnormality occurs in the active-system server device, wherein
the standby-system server device comprises:
at least one first memory storing program instructions; and
at least one first processor configured to execute the instructions stored in the first memory to:
access the predetermined service provided by the active-system server device through the network and perform monitoring processing in accordance with a protocol of the predetermined service to monitor whether the predetermined service is normally accessible; and monitor an operating system of the standby-system server device itself, and
the active-system server device comprises:
at least one second memory storing program instructions; and
at least one second processor configured to execute the instructions stored in the second memory to:
perform a failover when $n_2/n_1$ is greater than a predetermined value, $n_1$ being the number of the stand-by system server devices in which an abnormality has not been detected based on monitoring itself, $n_1$ being greater than or equal to 1, and $n_2$ being, of the $n_1$ standby-system server devices, the number of the standby-system server devices which have determined that the predetermined service provided by the active-system server device is not normally accessible, $n_2$ being greater than or equal to 1, and
refrain from performing the failover when $n_2/n_1$ is not greater than the predetermined value.

2. The cluster system according to claim 1, wherein
the second processor is further configured to execute the instructions stored in the second memory to monitor an operating state of the active-system server device itself, and
the second processor is further configured to execute the instructions stored in the second memory to determine, based on a monitoring result by the active-system server device, whether to perform a failover when an abnormality has been detected in all the standby-system server devices.

3. The cluster system according to claim 1, wherein the network is a public LAN, and is a different network from an interconnect LAN used to mutually perform life-and-death monitoring between the active-system server device and the standby-system server device.

4. A server device comprising:
at least one memory storing program instructions; and
at least one processor configured to execute the instructions to:
provide a predetermined service to a client device through a network;
acquire a monitoring result transmitted from a standby-system server device configured to access the predetermined service provided by the server through the network, perform monitoring processing in accordance with a protocol of the predetermined service to monitor whether the predetermined service is normally accessible, and monitor an operating state of the standby-system server device itself;

perform a failover when $n_2/n_1$ is greater than a predetermined value, $n_1$ being the number of the stand-by system server devices in which an abnormality has not been detected based on monitoring itself, $n_1$ being greater than or equal to 1, and $n_2$ being, of the $n_1$ standby-system server devices, the number of the standby-system server devices which have determined that the predetermined service provided by the server device is not normally accessible, $n_2$ being greater than or equal to 1, and refrain from performing the failover when $n_2/n_1$ is not greater than the predetermined value, wherein the standby-system server device is configured to take over the providing the predetermined service to the client device when the failover is performed.

5. A control method comprising:

providing a predetermined service to a client device through a network;

acquiring a monitoring result transmitted from a standby-system server device configured to access the predetermined service through the network, perform monitoring processing in accordance with a protocol of the predetermined service to monitor whether the predetermined service is normally accessible, and monitor an operating state of the standby-system server device itself;

performing a failover when $n_2/n_1$ is greater than a predetermined value, $n_1$ being the number of the stand-by system server devices in which an abnormality has not been detected based on monitoring itself, $n_1$ being greater than or equal to 1, and $n_2$ being, of the $n_1$ standby-system server devices, the number of the standby-system server devices which have determined that the predetermined service provided by the server device is not normally accessible, $n_2$ being greater than or equal to 1, and refraining from performing the failover when $n_2/n_1$ is not greater than the predetermined value, wherein the standby-system server device is configured to take over the providing the predetermined service to the client device when the failover is performed.

\* \* \* \* \*